Jan. 23, 1973     J. HARTUNG     3,712,845

TILE FLOOR COVERING AND METHOD OF COVERING A FLOOR SURFACE

Filed March 15, 1971

Josef Hartung
*Inventor.*

By Karl F. Ross
*Attorney*

United States Patent Office 3,712,845
Patented Jan. 23, 1973

---

3,712,845
TILE FLOOR COVERING AND METHOD OF COVERING A FLOOR SURFACE
Josef Hartung, Petersberg, Germany, assignor to Dura Tufting GmbH, Fulda, Germany
Filed Mar. 15, 1971, Ser. No. 124,171
Claims priority, application Germany, Mar. 17, 1970,
P 20 12 523.9
Int. Cl. B32b 3/16; E04f 15/02
U.S. Cl. 161—38     10 Claims

ABSTRACT OF THE DISCLOSURE

Textile tiles are coated on their undersides with filled polypropylene and are then placed, next to one another, on a layer of stabilized polyester, polyethylene or polyvinyl chloride.

---

My present invention relates to floor covering of the type wherein textile tiles, made from tufted, needled or woven fabrics, are provided with coherent undercoatings by which they rest on a supporting surface.

These tiles, which may be square or rectangular (e.g. 50 x 50 cm.), are arranged in a variety of patterns and, when properly juxtaposed, given the appearance of continuous flooring. Frequently, however, the continuity is disrupted by cracks developing between adjacent tiles on account of fabric shrinkage, shifting and/or warping.

The general object of my invention is to provide an improved flooring of this type which avoids the aforestated drawback.

A related object is to provide a method of making a covering of this character which can be deposited, without cementing, on any type of conventional floor surface.

In accordance with this invention, I place on the floor surface to be covered, a continuous substrate (preferably in sheet form) of synthetic resin and deposit thereon a multiplicity of closely adjoining textile tiles with a synthetic-resin undercoating, the substrate and the undercoating contacting each other with sufficient adhesion to prevent any significant warping, shifting or shrinkage which would mar the appearance of the floor covering.

Advantageously, the undercoating consists of a filled thermoplastic material such as atactic polypropylene and is applied to the fabric as a hot melt to form a layer which may have a thickness roughly equal to that of the fabric. Suitable fillers or extenders include particles of titanium dioxide, clay (bentonite), or carbon black.

The substrate may be a sheet of a plastic material having a certain affinity for the resin of the undercoating, such as polyester, polyethylene or polyvinyl chloride, preferably in the form of a foil substantially thinner than the tiles. This foil may have a thickness on the order of 1 mm., advantageously ranging between 0.2 to 1.2 mm.

The synthetic resin of the substrate may be stabilized against the effects of temperature variations and aging by conventional additives such as benzophenone or dibutyltin compounds.

The invention will be described in detail hereinafter with reference to the accompanying drawing in which.

Figure 1:
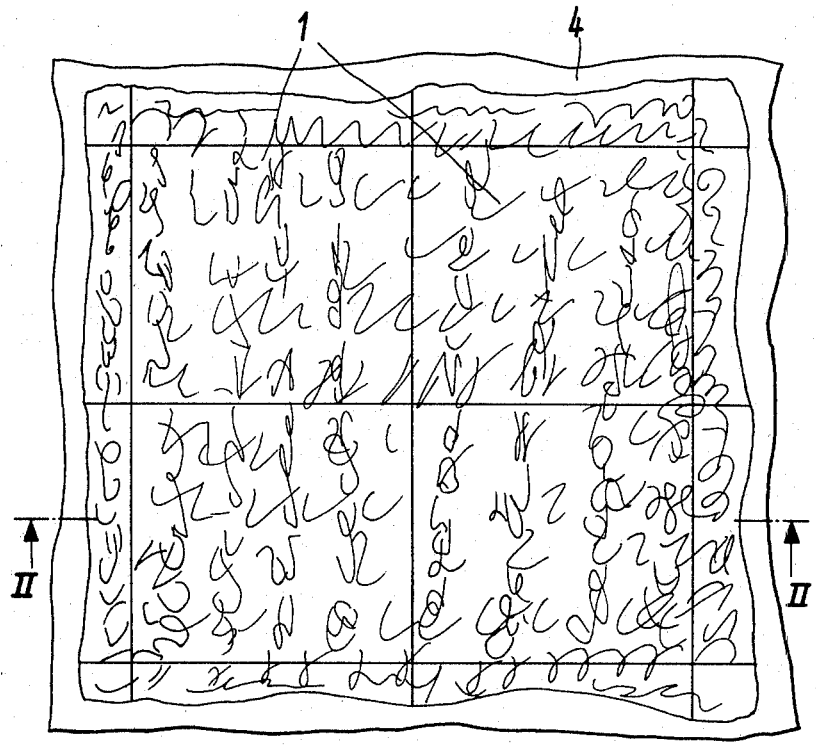
FIG. 1 is a top view of my improved floor covering.
Figure 2:
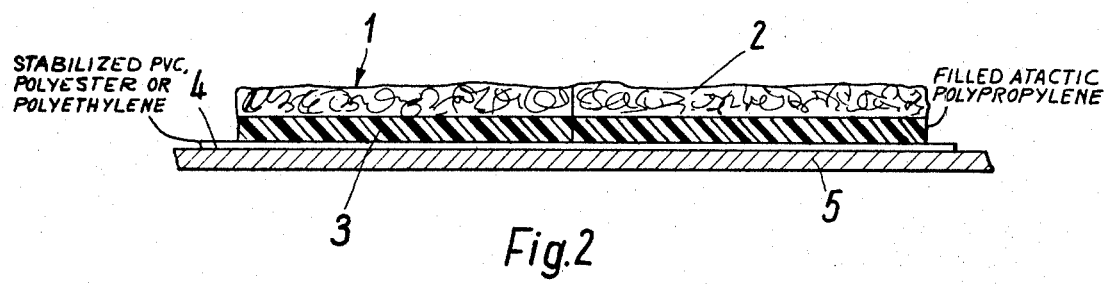
FIG. 2 is a cross-sectional view taken on the line II—II of FIG. 1.

The floor covering shown in the drawing comprises an array of closely juxtaposed textile tiles 1 having undercoatings 3 of synthetic resin, such as filled atactic polypropylene, bonded to their fabric structure 2. A floor surface 5 is overlain by a foil 4 of stabilized polyester, polyethylene or, preferably, polyvinyl chloride. The foil 4 is at least coextensive with the array of tiles 1 and may extend beyond the latter if the tiles cover less than the entire floor surface.

In use, the pressure of traffic (including the movement of wheeled pieces of furniture, wagons, wheel chairs of the like) causes a certain adhesion to develop between the plastic materials of coatings 3 and sheet 4 which prevents any relative displacement thereof and maintains the continuity of the composite flooring.

I claim:

1. A method of covering a floor surface, comprising the steps of placing on said floor surface a continuous substrate of synthetic resin and depositing on said substrate a multiplicity of closely adjoining textile tiles with a synthetic-resin undercoating.

2. A method as defined in claim 1 wherein said undercoating is applied to said tiles as a hot melt.

3. A method as defined in claim 2 wherein said undercoating consists of filled atactic polypropylene.

4. A method as defined in claim 1 wherein said substrate is a sheet of a synthetic resin selected from the group which consists of polyester, polyethylene or polyvinylchloride.

5. A method as defined in claim 4 wherein the synthetic resin of said sheet is admixed with a stabilizer.

6. A floor covering comprising an array of closely juxtaposed textile tiles each provided with an undercoating of synthetic resin, and a continuous substrate of synthetic resin underlying said tiles in contact with said undercoating thereof.

7. A floor covering as defined in claim 6 wherein said undercoating consists of filled atactic polypropylene.

8. A floor covering as defined in claim 6 wherein said substrate is a sheet of a synthetic resin selected from the group which consists of polyester, polyethylene or polyvinyl chloride.

9. A floor covering as defined in claim 6 wherein said sheet is a foil substantially thinner than said tiles.

10. A floor covering as defined in claim 9 wherein said foil has a thickness on the order of one millimeter.

References Cited

UNITED STATES PATENTS

| | | | |
|---|---|---|---|
| 3,335,048 | 8/1967 | Morain | 161—38 |
| 2,763,587 | 9/1956 | Masland | 161—38 |
| 2,678,896 | 5/1954 | Dratler | 52—389 X |

PHILIP DIER, Primary Examiner

U.S. Cl. X.R.

52—309, 389; 156—71, 297; 161—39, 165, 252